United States Patent [19]

Rowland et al.

[11] Patent Number: 5,512,219
[45] Date of Patent: Apr. 30, 1996

[54] METHOD OF CASTING A MICROSTRUCTURE SHEET HAVING AN ARRAY OF PRISM ELEMENTS USING A REUSABLE POLYCARBONATE MOLD

[75] Inventors: William P. Rowland, Southington; David C. Martin, Berlin, both of Conn.

[73] Assignee: Reflexite Corporation, Avon, Conn.

[21] Appl. No.: 253,676

[22] Filed: Jun. 3, 1994

[51] Int. Cl.⁶ .......................... B29C 33/40; B29C 33/56
[52] U.S. Cl. ........................ 264/1.6; 264/1.9; 264/2.5; 264/225; 249/114.1
[58] Field of Search ..................... 264/1.36, 1.6, 264/1.9, 2.5, 225; 249/114.1; 156/245

[56] References Cited

U.S. PATENT DOCUMENTS

| | | | |
|---|---|---|---|
| 2,310,790 | 2/1943 | Jungersen | 359/547 |
| 2,380,447 | 7/1945 | Jungersen | 359/547 |
| 2,481,757 | 9/1949 | Jungersen | 264/1.9 |
| 2,538,638 | 1/1951 | Wilson | 264/1.9 |
| 3,081,495 | 3/1963 | Kovatch | 264/224 |
| 3,417,959 | 12/1968 | Schultz | 249/117 |
| 3,684,348 | 8/1972 | Rowland | 264/1.9 |
| 3,689,346 | 9/1972 | Rowland | 156/245 |
| 3,712,706 | 1/1973 | Stamm | 359/531 |
| 3,810,804 | 5/1974 | Rowland | 156/245 |
| 3,811,983 | 5/1974 | Rowland | 156/245 |
| 3,830,682 | 8/1974 | Rowland | 359/530 |
| 3,935,359 | 1/1976 | Rowland | 428/172 |
| 3,975,083 | 8/1976 | Rowland | 359/514 |
| 3,992,080 | 11/1976 | Rowland | 264/1.9 |
| 4,017,238 | 4/1977 | Robinson | 425/174.6 |
| 4,055,613 | 10/1977 | Kapral | 264/46.4 |
| 4,159,292 | 6/1979 | Neefe | 264/225 |
| 4,202,600 | 5/1980 | Burke et al. | 359/514 |
| 4,243,618 | 1/1981 | Van Arnam | 264/2.5 |
| 4,244,683 | 1/1981 | Rowland | 425/143 |
| 4,332,847 | 6/1982 | Rowland | 428/156 |
| 4,432,832 | 2/1984 | Fantone | 156/245 |
| 4,478,769 | 10/1984 | Pricone et al. | 264/2.5 |
| 4,555,161 | 11/1985 | Rowland | 359/530 |
| 4,576,850 | 3/1986 | Martens | 428/156 |
| 4,634,484 | 1/1987 | Wagner | 156/219 |
| 4,668,558 | 5/1987 | Barber | 428/156 |
| 4,703,999 | 11/1987 | Benson | 359/532 |
| 4,755,425 | 7/1988 | Huang | 428/331 |
| 4,801,193 | 1/1989 | Martin | 359/518 |
| 4,844,976 | 7/1989 | Huang | 428/323 |
| 5,087,191 | 2/1992 | Heise et al. | 425/335 |
| 5,117,304 | 5/1992 | Huang et al. | 359/529 |
| 5,171,624 | 12/1992 | Walter | 428/156 |
| 5,183,597 | 2/1993 | Lu | 264/1.9 |
| 5,229,882 | 7/1993 | Rowland | 359/530 |
| 5,264,063 | 11/1993 | Martin | 156/247 |
| 5,266,257 | 11/1993 | Kildune | 264/224 |

FOREIGN PATENT DOCUMENTS

| | | |
|---|---|---|
| 2217566 | 10/1973 | Germany . |
| 3332460 | 4/1984 | Germany . |
| 4302472 | 6/1993 | Germany . |

*Primary Examiner*—Robert Davis
*Attorney, Agent, or Firm*—Hamilton, Brook, Smith & Reynolds

[57] ABSTRACT

A durable reusable polymeric mold for casting a microstructure sheet having an array of prism elements and a method for forming the microstructure sheet are disclosed. A polymeric mold has a facet side and a base side including an array of prism elements upon which an radiation cured sheet can be formed. A protective surface layer can be formed on the facet side of the polymeric mold. The protective surface layer is sufficiently opaque to radiation to protect the polymeric mold from damage when the curable sheet is formed and is sufficiently bonded to the polymeric mold to allow the cured sheet to be removed from the protective surface layer while not substantially removing the protective surface layer from the polymeric mold. The microstructure sheet can be used as a retroreflective structure.

10 Claims, 2 Drawing Sheets

METHOD OF CASTING A MICROSTRUCTURE SHEET HAVING AN ARRAY OF PRISM ELEMENTS USING A REUSABLE POLYCARBONATE MOLD

BACKGROUND OF THE INVENTION

Retroreflective materials are employed for various safety purposes such as highway signs, street signs, pavement markings, tape and patches on clothing which are highly visible to a driver of a car at night. Particularly, these materials are useful at night time when visibility is critical under low light conditions.

One type of retroreflective material is formed of cube-corner or prism retroreflectors, such reflectors, are described in U.S. Pat. No. 3,712,706, issued to Stamm (Jan. 23, 1973). Generally, the prisms are made by forming a master die on a flat surface of a metal plate. To form the cube corners, three series of parallel equidistance intersecting v-shaped grooves at 60° angles to each other are inscribed in the flat plate. An electroformed opposite shape of the die is then used to form the desired cube-corner array into a flat plastic surface. When the groove angle is 70 degrees, 31 minutes, 43.6 seconds, the angle formed by the intersection of two cube faces (the dihedral angle) is 90 degrees, and the incident light is retroreflected back to the source.

The efficiency of a retroreflective structure is a measure of the amount of incident light returned within a cone diverging from the axis of retroreflection. Distortion of the prism structure adversely affects the efficiency. When faces of the cube corners are air backed (not metalized to achieve specular reflection) and where corners are not tilted in an array to achieve improved angularity, cube-corner retroreflective elements have low angularity, i.e., the elements will only brightly reflect light that impinges on it within a narrow angular range centering approximately on its axis of retroreflection. Low angularity arises from the inherent nature of these elements which are trihedral structures having three mutually perpendicular lateral faces. Cube-corner elements operate according to the principle of total internal reflection when air backed and to the principle of specular reflection when backed with a reflective metal coating. A cube-corner element receives a ray of incident light from a source and sends it back toward the same source in a direction that is substantially parallel to the ray of incident light. The elements are arranged so that the light to be retroreflected impinges into the internal space defined by the faces, and retroreflection of the impinging light occurs by total internal reflection of the light from face to face of the element. Impinging light that is inclined substantially away from the axis of retroreflection of the element (which is the trisector of the internal space defined by the faces of the element) strikes the face at an angle less than its critical angle, thereby passing through the face rather than being reflected.

Further details concerning the structures and the operation of cube-corner microprisms can be found in U.S. Pat. No. 3,684,348, issued to Rowland (Aug. 15, 1972), incorporated in its entirety by reference herein. A method for making retroreflective sheeting is also disclosed in U.S. Pat. No. 3,689,346, issued to Rowland (Sep. 5, 1972), and the casting of the ultraviolet cured retroreflective microprisms on a substrate or mold is described in U.S. Pat. No. 3,810,804, issued to Rowland (May 14, 1974). The teachings of both references are incorporated by reference herein. The method disclosed in U.S. Pat. No. 3,689,346, teaches forming cube-corner microprisms in a cooperatively configured mold. The prisms are bonded to sheeting to form a composite structure in which the cube-corner formations project from one surface of the sheeting. The molds are commonly nickel electroforms either formed by the "pin bundle" technique or are nickel electroforms of engravings made by precision ruling machines.

One method for forming retroreflective sheeting is by compression molding polymeric sheeting against the electroform. In a second method, sheeting can be formed by casting oligomers against the electroforms, laminating a substrate film over the oligomer, and radiation curing the oligomer. A disadvantage of nickel electroform molds is that nickel, which is soft and malleable, is very easily scratched and disfigured from handling. Further, forming the electroform molds is expensive and time consuming.

For continuous casting of retroreflective sheeting, the nickel electroforms are fabricated into a continuous belt. However, the fabrication and mounting steps offer many opportunities to scratch and dent the fragile surface of the nickel electroform.

Therefore, a need exists for a reusable mold for casting a retroreflective sheet having an array of prism elements that overcome the disadvantages of described above.

SUMMARY OF THE INVENTION

The present invention relates to a reusable mold and method for casting a microstructure sheet having an array of prism elements. The mold is formed of a polymeric material and has a facet side and a base side comprising an array of prism elements upon which a radiation cured matrix of retroreflective prism elements can be formed. A protective surface layer is formed on the facet side of the polymeric mold. The protective surface layer is sufficient to protect the polymeric mold from radiation damage when the radiation cured sheet is formed. The protective surface layer is sufficiently bonded to the polymeric mold to allow the cured sheet to be removed from the protective surface layer while not substantially removing the protective surface layer from the reusable polymeric mold. The prism elements are typically cube-corner retroreflective microprism elements.

A method for forming a reusable mold for curing a microstructure matrix of a radiation curable plastic material having an array of prism elements includes providing an embossing mold having a facet side with a positive array of prism elements and a base side. The embossing mold can be ruled or electroformed. A polymeric compound is molded on the facet side of the embossing mold to form a polymeric mold comprising a negative array of retroreflective prism elements. A protective surface layer is applied to the negative array of prism elements, thereby forming a reusable mold.

A method for casting a microstructure sheet includes providing an embossing mold having a facet side with an array of positive prism elements and a base side. A thermoplastic compound is molded on the facet side of the embossing mold to form a polymeric mold having a facet side comprising an array of negative prism elements. The formed polymeric mold is removed. A metal coating is applied to the facet side of the embossing mold. The retroreflective sheet is cast on the metal coating by applying a plastic compound, laminating a carrying film over the plastic compound, and curing the plastic compound and the carrying film to form the sheet having a facet side and window side. The casted sheet is removed.

This invention provides many advantages. One advantage is that the reusable polymeric mold does not swell or distort in the presence of uncured oligomers that are used in forming retroreflective prism elements. Another advantage is that the hardened prism elements are easily separated from the polymeric molds without appreciable damage, wear or distortion to the mold, thereby rendering it reusable. Further, by providing a vacuum metallized protective layer to the embossed surface of the polymeric mold, the layer protects the mold from the radiation used to cure the oligomer, thereby reducing the degradation of the polymeric mold. Another advantage is that the polymeric mold is resistant to scratching and disfiguration.

DETAILED DESCRIPTION OF THE INVENTION

The features and other details of the method and apparatus of the invention will now be more particularly described with reference to the accompanying drawings and pointed out in the claims. The same numeral presented in different figures represent the same item. It will be understood that the particular embodiments of the invention are shown by way of illustration and not as limitations of the invention. The principle features of this invention can be employed in various embodiments without departing from the scope of the invention. All parts and percentages are by weight unless otherwise specified.

Figure 1:
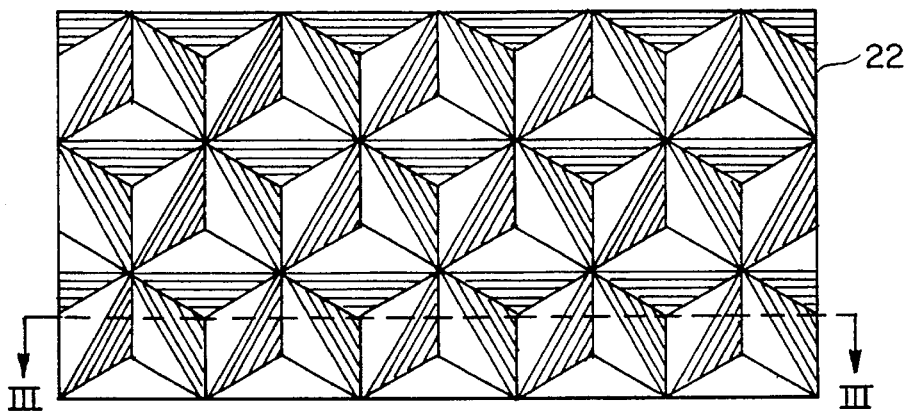
FIG. 1 is a top view of a retroreflective sheet.
Figure 2:
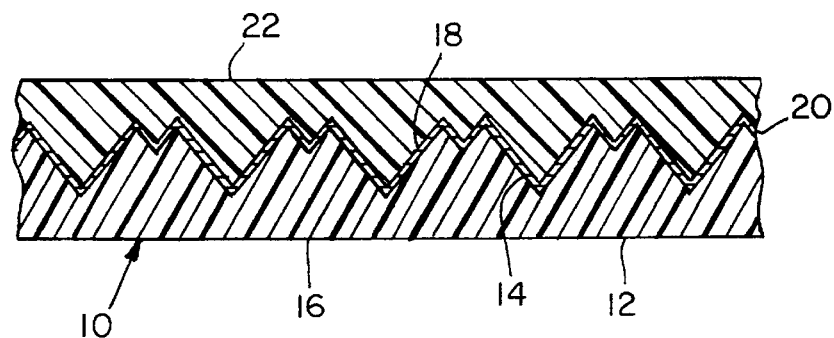
FIG. 2 is a cross-sectional view of a portion of a first embodiment of a reusable mold of the present invention for casting the retroreflective sheet shown in FIG. 1 along line III—III.

A top view of a retroreflective structure 22 is shown in FIG. 1 having an array of cube-corner elements. One embodiment of the invention is shown in FIG. 2, which is a cross-sectional view of FIG. 1 along lines III—III, of a polymeric mold 10 of the invention with a protective surface layer 20 formed thereon and the casted retroreflective sheeting 22 which is shown as the retroreflective structure in FIG. 1. Polymeric mold 10 is formed of prism array 12 having a facet side 14 and a base side 16. The facet side 14 forms an array of prism elements upon which an ultraviolet cured sheet can be molded. In one embodiment, the prism elements of the mold are cube-corner prism elements arranged to form a microstructure. Other prism elements include Fresnel lenses. The cube-corner prism elements can have a length along each cube-side edge 18 in the range of between about 0.001 and 0.020 inches. In one embodiment, each cube-side edge 18 has a length of about 0.006 inches. The polymeric mold is preferably formed from a thermoplastic polymer. A preferred thermoplastic includes properties that allow easy fabrication by methods including thermal forming, extrusion and other molding methods. The thermoplastic material has properties that include non-corrosiveness, non-toxicity, stain resistance, low-water adsorption, high impact, heat resistance, dimensional stability, and stability to oligomers that are the source of the radiation cured material used to form retroreflective sheeting. In a preferred embodiment, the thermoplastic material of the mold 10 is a polycarbonate that has a specific weight of about one, a softening temperature of about 154° C. and a melting temperature of about 260° C. The polymeric mold can be formed into arched sections which are attached to a drum for forming a continuous sheet. Alternatively, the polymeric mold can be formed into a flexible continuous belt.

A protective surface layer 20 is formed by vapor deposition or other suitable method on the facet side of the polymeric mold 10. The protective surface layer 20 is sufficiently reflective or opaque to protect the polymeric mold from damage or becoming sensitized by ultraviolet light when the radiation curable sheeting 22 is formed. The protective surface layer 20 has a sufficiently uniform layer to allow the formation of a uniform sheet of retroreflective sheeting. For example, protective surface layer 20 can have a thickness in the range of between about 400 and 800 Angstroms. Further, the protective surface layer 20 is sufficiently bonded to the polymeric mold 10 by adhesion to allow the radiation cured sheet 22 to be removed from the protective surface layer 20 while not substantially removing the protective surface layer 20 from the polymeric mold. In one embodiment, the protective surface layer is a protective coating 20 which is formed by sputtering aluminum, silver, gold or other suitable metal or by vacuum metallization. Alternatively, dielectric coatings which block UV light can be employed with or without the use of adhesives.

Figure 3A:
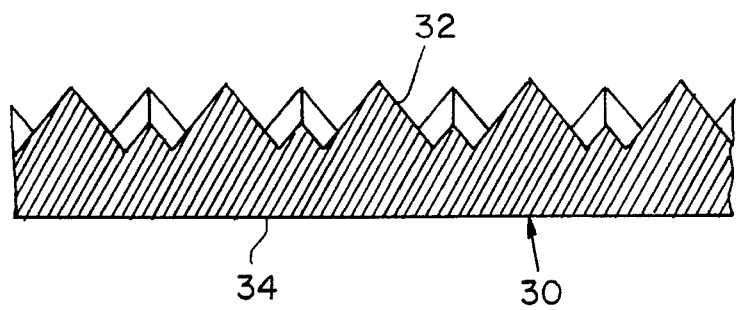
FIGS. 3A, 3B, 3C, 3D, 3E and 3F are cross-sectional views at various steps in the method for forming a retroreflective structure similar to the one shown in FIG. 1 along line III—III with a reusable mold of the present invention.

In FIGS. 3A, 3B, 3C, 3D, 3E and 3F, a preferred method for forming an embodiment of the reusable polymeric mold is shown at various steps in the process of forming the structure. The steps are shown in a cross-sectional view at a point similar to the cross-sectional view of FIG. 1 along lines III—III of retroreflective sheeting 22. In FIG. 3A, the embossing mold or master mold 30 having an array of elements for forming retroreflective sheeting, a facet side 32 having a prism array and a base side 34 is formed of a metal, such as nickel. The embossing mold 30 is formed typically by the "pin bundle" technique or is engraved by precision ruling machines to form a cube-corner array. Typically, the second, fourth, etc. electroformed generation of the pin bundle or ruled master is used as the embossing mold. See U.S. Pat. No. 4,244,683, issued to Rowland (Jan. 13, 1981) and U.S. Pat. No. 4,332,847, issued to Rowland (Jun. 1, 1982), the teachings of which are herein incorporated by reference. However, other types of microstructure elements can also be provided on the embossing mold 30 including Fresnel lenses.

The prism array of the embossing mold 30 is a positive array. However, the prism array can be a negative array in some embodiments. A positive array of prism elements is considered "points out", wherein the apexes of the corners of the cubes or prisms extend outward from the mold toward the viewer, and conversely, a negative array of prism elements is considered "points in", wherein the apexes of the corners of the cubes or prisms extend into the mold away from the viewer.

Figure 3B:
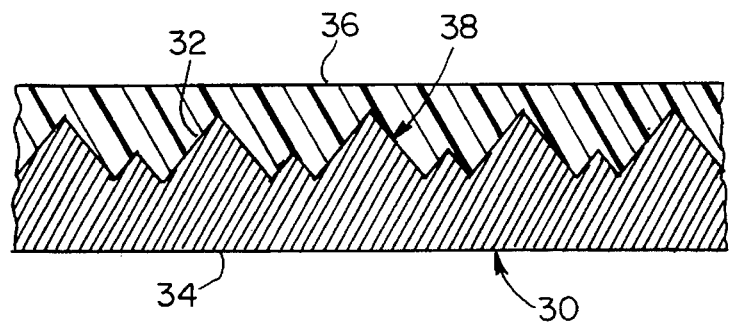

In FIG. 3B, a polymeric compound, such as a thermoplastic, is disposed on the facet side of the embossing mold 30 to form a polymeric disposable mold 20 having a negative prism array 38. The thermoplastic is pressed to form a mirror image prism structure of the embossing mold 30. Sufficient pressure is applied to the thermoplastic while in the embossing mold 30 to allow it to flow into all the recesses of the embossing mold. In one embodiment, the thermoplastic is compressed between heated platens. This process will yield a single sheet. These sheets can be taped or glued together to make a continuous casting belt. Also, an apparatus, as shown in U.S. Pat. Nos. 4,244,683 and 4,332,847, can produce continuous lengths of embossed polycarbonate which can be cut to a length to form a belt and the ends are attached together to form a continuous belt. In another embodiment, a continuous length has the ends of the belt overlapped and cut with a razor thereby forming two ends that can be joined together. The ends are then aligned and taped or are sealed together by some other suitable means, such as ultrasonic welding. In one embodiment, the ends are taped together with an adhesive polyester tape available from Minnesota Mining and Manufacturing Co. The belt can be serpentinely folded to provide a long continuous belt having one seam. For instance, a belt of one hundred feet can be embossed or compression molded and joined to form a loop having one splice, thereby allowing retroreflective sheeting to be formed having only one splice mark every one hundred feet that is of about one or two prism widths. In one embodiment, the sheeting is formed by applying pressure for about 80 seconds at 300 pounds per square inch, while at a temperature of about 435° F. (224° C.).

Other methods for embossing a continuous polycarbonate mold include embossing the polycarbonate sheet in a hydraulic press while the embossed thermoplastic is still hot and moldable. The sheeting can be embossed between rolls, wherein one of the rolls is coated with a metal skin whose surface, has a microprism pattern in the form of projecting prisms. Another system includes using a continuous pressure belt which encases a substantial portion of a drum embossing mold to extend the length of time the thermoplastic is under pressure against the embossing mold.

Figure 3C:
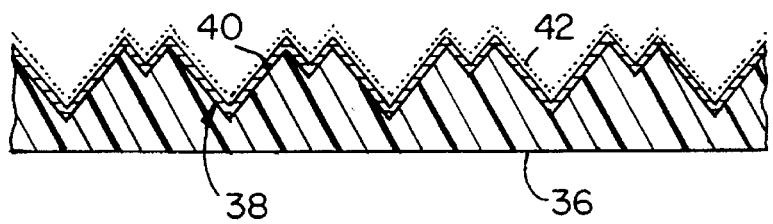

As shown in FIG. 3C, after a continuous sheet of an embossed polymeric mold 36 is fabricated and removed from the embossing mold 30, a protective surface layer 40 is applied to the negative array 38 of prism elements to form a reusable polymeric mold 36. The protective surface layer 40 is composed of a material that allows the release of a casted retroreflective sheeting while maintaining essentially the same optical surface quality of the reflecting faces of the corner cubes. The protective surface layer 40 can be vacuum metallized. The metal is deposited by evaporating the metal in a vacuum or by directing an electron beam on a target metal to evaporate it in a vacuum. The metal vapor condenses on the negative prism array 38 of the polymeric mold 36. Also, the metal can be deposited by a sputtering process where the metal is dislodged from a metal target by bombarding it with argon ions. The dislodged atoms of metal are then deposited on the polymeric mold 36 with very high energy giving superior adhesion than achieved by the evaporation processes. Prior to applying the monomer or oligomer, a release agent layer 42 can be disposed on the protective surface layer 40.

Figure 3D:
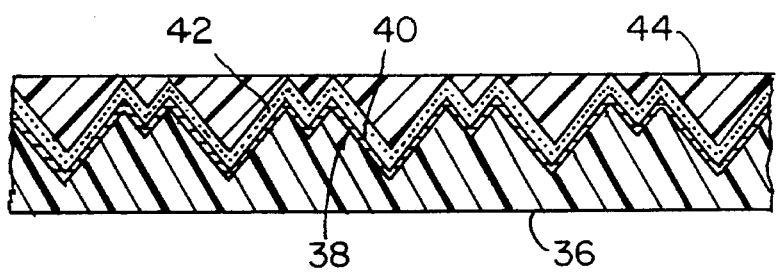

In FIG. 3D, a monomer or oligomer is applied to protective layer 40 to form a transparent prism array 44. The monomer or oligomer is a precursor of a transparent polymer. These polymers can be considered either rigid or soft and are selected from a wide variety of polymers that include polyvinyl chloride, polyethylene, polystyrene, polycarbonate, polyester, polynitrile, and polyolefins. The polymers further include the polymers of urethane, acrylic acid esters, epoxy acrylates, acrylated silanes, and urethane acrylates.

Figure 3E:
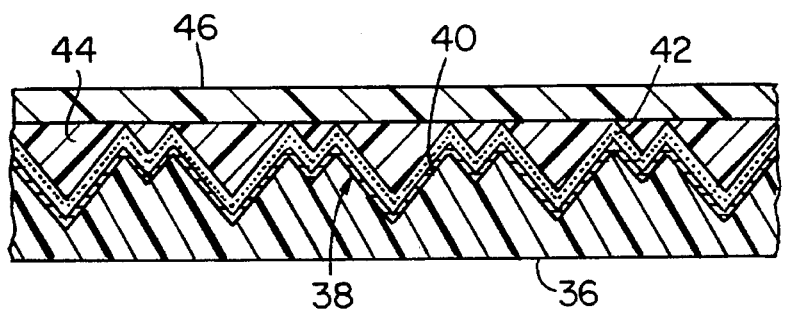

In FIG. 3E, a carrying film 46 is laminated to the prism array 44. Polymerization of the monomer or oligomer by cross-linking can then be initiated chemically or by heat, ultraviolet radiation or another energy source to form the prism array 44. Radiation curing can occur through carrying film 46. Alternatively, the polymerization can be chemically activated by a catalyst. The release agent layer 42 is comprised of a composition selected from silicons. The casting of the ultraviolet cured microprisms on a substrate using a mold is described in U.S. Pat. Nos. 3,684,348, 3,689,346 and 3,810,804. The carrying film 46 can have a thickness in the range of between about 0.0005 and 0.02 inches. In a preferred embodiment, the thickness is in the range of between about 0.002 and 0.01 inches. The selected thickness is dependent upon the thermoplastic selected and the characteristics desired for the retroreflective structure. The carrying film 46 can be comprised of a transparent thermoplastic plastic film, such as polyvinyl chloride, polyvinylidene chloride, urethane films, polyesters, polycarbonates, polymethylmethacrylate, etc. which are extensible or flexible or both. The carrying film 46 can be transparent to visible, infrared, and ultraviolet light and can be either clear or colored. Suitable colors include yellow, orange or green. An example of a suitable carrying film is a polyvinyl chloride film available from Renolite Corporation under the trade name Renolite™ H1W series. Another suitable carrying film is a polyester available under the trade name Melenex #393 from Imperial Chemical Industries.

Figure 3F:
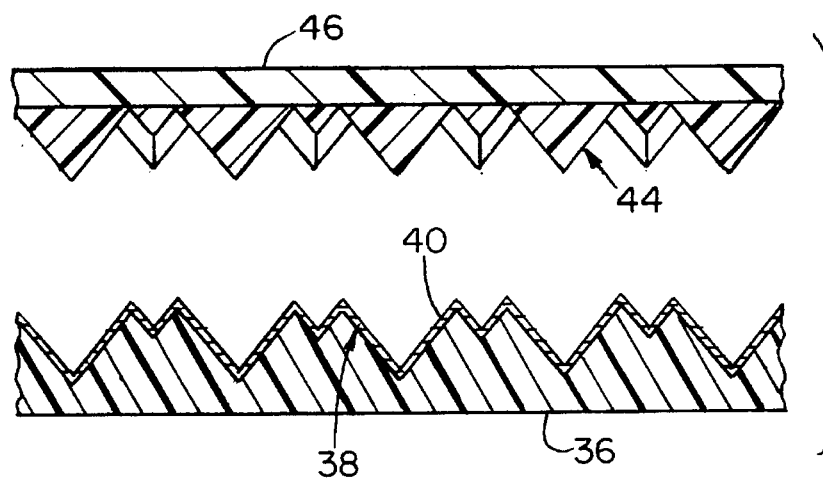

In FIG. 3F, the formed retroreflective structure comprising transparent prism array 44 and carrying film 46 is removed from polymeric mold 36. The steps of forming other retroreflective structures can be repeated with the polymeric mold 36.

EXAMPLE 1

A flat, rectangular nickel electroform was produced that had a points out cube-corner prism pattern. The nickel electroform had a length of nine inches and a width of nine inches. The depth of the ruled cuts in the electroform was 2.8 mils. Employing an apparatus as described in U.S. Pat. No. 4,244,683, a polycarbonate from the General Electric Company having an average specific gravity of about 1.2 was compression molded at 132° C. on the points out mold side and 238° C. on the opposite side with the prism array to form a negative array (points in) at 300 pounds per square inch for 120 seconds. The molded polycarbonate sheeting was formed having a thickness of 10 mils.

The formed sheets were vacuum metallized with aluminum to form a protective layer. The protective layer had a thickness of 500 Angstroms.

A photometric reading of the retroreflective brightness in $cd/lux/m^2$ was measured on the metallized polycarbonate sheeting. Values of approximately 1,000 $cd/lux/m^2$ at a $-4°$ entrance angle and a $0.2°$ observation angle were obtained.

An oligomer cast was made by hand on the facet side of the metallized polycarbonate. The oligomer was spread over the embossing surface followed by removing any air trapped in the prism cavities by placing the sample in a vacuum of $10^{-3}$ Torr for five minutes. A carrying film was laminated over the oligomer with a pair of nipping rollers which squeezed the excess oligomer to the edge of the sample at a pressure of about 10 to 11 pounds per linear inch. The oligomer formulation was laminated to the carrying film, ICI Melenex #393, having a thickness of 0.002 inches.

The resulting laminate was then exposed to ultraviolet light. This was done while immersing the laminate in a shallow pan of water heated to 160° F. (71° C.) to control the cure temperature. Then the pan of water with the laminate was passed under a 400 watts/square inch metal halide ultraviolet lamp at 20 feet/minute. The step of exposing the laminate was repeated a second time. After the sample was removed and dried, the laminate of cured oligomer prisms on the carrying film was peeled off the embossed polycarbonate mold. The sheeting was measured for retroreflecting brightness. The brightness was observed as having about 1,000 cd/lux/m² at a −4° entrance angle and a 0.2° observation angle. Twenty-five hand casts were made from the metallized polycarbonate mold. The photometric readings for each non-metalized sample were all in this range of between 800 and 1,000 cd/lux/m². Visually, the mold appeared to be the same at the end of the test as in the beginning with no noticeable scratches or wear.

EXAMPLE 2

The polycarbonate molds formed by the method described in Example 1 were compressed at various pressures to determine the lowest pressure that could be used and still produce a useful mold. Pressures of less than about 30 pounds per square inch produced incomplete molding of the polycarbonate using a Carver press built by Fred Carver, Inc.

Five polycarbonate molds were formed at 30 pounds per square inch, while at a temperature of 270° F. (132° C.) on the platen next to the positive electroform mold and at 460° F. (238° C.) on a second platen. The samples were each pressed for two minutes. One of the above described polycarbonate molds was selected for producing retroreflective sheets. This polycarbonate mold was not metallized. Hand casts were made in a manner described in Example 1. Photometric readings on the finished, non-metalized retroreflective sheets were approximately 800 cd/lux/m² at a −4° entrance angle and a 0.2° observation angle.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

We claim:

1. A method for forming a reusable mold for curing a retroreflective sheet of a radiation curable plastic material having an array of prism elements, comprising the steps of:
   a) providing an embossing mold having a facet side with a positive array of prism elements and a base side;
   b) molding a polycarbonate material on the facet side of said embossing mold to form a mold comprising a negative array of prism elements.

2. The method of claim 1 wherein the prism elements are cube-corner microprism elements.

3. The method of claim 2 wherein the embossing mold is circular to thereby allow continuous formation of the polymeric mold.

4. The method of claim 1 wherein a protection surface layer is formed on the mold.

5. The method of claim 4 wherein said protective surface layer is a metal selected from the group consisting of aluminum, silver and gold.

6. A method for forming a microstructure from a polymeric reusable mold wherein said microstructure has prism elements having a base side and a facet side, comprising the steps of:
   a) forming a first mold having a positive prism array pattern;
   b) forming a second mold of polycarbonate material in said first mold, said second mold comprising a negative prism array pattern;
   c) removing the second mold from the first mold;
   d) coating the negative prism array pattern on the second mold with a protective surface layer that is opaque to radiation;
   e) forming a positive prism array structure over said protective surface layer by curing of a plastic material on said second mold;
   f) removing said structure from said second mold to form a retroreflective structure while said protective layer adheres to said second mold; and
   g) reusing said second mold to form additional retroreflective structures.

7. A method for casting a retroreflective sheet, comprising the steps of:
   a) providing an embossing mold having a facet side with an array of positive prism elements and a base side;
   b) molding a polycarbonate material on the facet side of said embossing mold to form a polycarbonate mold having a facet side comprising an array of negative prism elements;
   c) removing the formed polycarbonate mold;
   d) applying a coating to the facet side of said polycarbonate mold to form a protective layer;
   e) casting the retroreflective sheet on said protective layer of said polycarbonate mold by
      i) applying a plastic compound,
      ii) laminating a carrying film over said plastic compound, and
      iii) curing said plastic compound and said carrying film to form the retroreflective sheet having a facet side and window side; and
   f) removing said casted retroreflective sheet.

8. The method of claim 7 wherein the protective layer is a reflective metallization layer.

9. A method for forming arrays of cube-corner microprism elements from polycarbonate reusable molds wherein said microprism elements have a base side and a facet side, comprising the steps of:
   a) forming a first master mold having a positive cube-corner microprism array pattern;
   b) forming a continuous belt mold in said first mold, said continuous belt mold being formed of polycarbonate material comprising a negative cube-corner microprism array pattern, to thereby allow the continuous formation of additional retroreflective structures;
   c) removing the continuous belt mold from the first mold;
   d) forming a positive cube-corner microprism array structure on said continuous belt mold layer by curing a plastic material applied to said array structure;
   e) removing said structure from said continuous belt mold to form a retroreflective structure; and
   f) reusing said continuous belt mold to form additional retroreflective structures.

10. The method of claim 9, wherein the second mold is a continuous belt, thereby allowing the continuous formation of additional retroreflective structures.

\* \* \* \* \*